May 20, 1930.　　　C. FERVERS　　　1,759,568
FEEDER OR TEAT FOR FEEDING BOTTLES
Filed Nov. 10, 1928
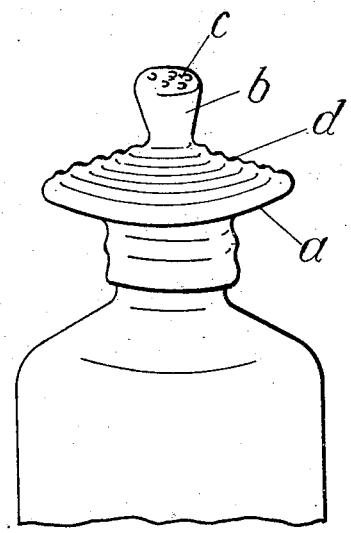
INVENTOR:
Carl Fervers
BY: Reuge, Boyer Hoakelas
 ATTORNEYS.

Patented May 20, 1930

1,759,568

UNITED STATES PATENT OFFICE

CARL FERVERS, OF COLOGNE-ON-THE-RHINE, GERMANY

FEEDER OR TEAT FOR FEEDING BOTTLES

Application filed November 10, 1928, Serial No. 318,328, and in Germany August 14, 1926.

This invention concerns improvements in feeders or teats for feeding bottles, the object being to provide a teat which reproduces faithfully the conditions under which an infant is nursed at its mother's breast.

According to the invention the head of the teat protrudes from the surface of the halo which rises towards the centre and the halo is made in one piece with said teat from a resilient material, the arrangement being such that the length of the teat is considerably less than the radius of the halo, being about a half thereof, and its thickness increases towards the free end containing the orifices; thus not only the shape of the feeder but also the mode of sucking correspond exactly to the natural conditions of nursing at the mother's breast. According to a further feature of this invention the smooth halo, similarly to a natural breast, is furnished with irregularities, such as grooves or the like so that the lips of the child when sucking form an air-tight seal on the halo and there is no possibility of unhealthy air drinking. Beyond this the teat only serves to rest quietly in the mouth of the child, without being touched by the lips. Due to its short form the disadvantageous collapse of said teat is no longer possible and the milk flows quietly and without interruption to the child from the bottle. At the free end of the teat there is preferably a series of small suction orifices such as are also to be found in the teat of the natural female breast.

One form of feeder or teat according to the invention is illustrated by way of example in the accompanying drawing.

This feeder has a halo *a* furnished with grooves or the like *d* from the centre of which protrudes the teat *b*; said teat is thinner at the end where it is attached and widens towards its free end. Fine orifices *c* are provided in the free end of the teat.

Having now particularly described and ascertained the nature of my said invention and in what manner the same is to be performed, I declare that what I claim is:—

A feeder for nursing bottles, comprising a shallow conical breast portion having annular corrugations in its outer surface and a centrally projecting teat integral with the breast portion and substantially shorter than the radius of said breast portion, the diameter of the lower portion of the teat being less than that of the outer portion thereof.

In testimony whereof I have signed my name to this specification.

Dr. CARL FERVERS.